(12) United States Patent
Sindia et al.

(10) Patent No.: US 10,675,980 B2
(45) Date of Patent: Jun. 9, 2020

(54) WIRELESS CHARGING APPARATUS WITH CONTROLLED POWER LEVEL ADJUSTMENT

(71) Applicant: Intel Corporation, Santa Clara, CA (US)

(72) Inventors: Suraj Sindia, Hillsboro, OR (US); Songnan Yang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 975 days.

(21) Appl. No.: 14/846,685

(22) Filed: Sep. 4, 2015

(65) Prior Publication Data

US 2017/0066334 A1 Mar. 9, 2017

(51) Int. Cl.
*B60L 53/12* (2019.01)
*B60L 11/18* (2006.01)
(Continued)

(52) U.S. Cl.
CPC ............ *B60L 11/182* (2013.01); *B60L 53/12* (2019.02); *H02J 7/0088* (2013.01); *H02J 7/025* (2013.01); *H02J 7/042* (2013.01); *H02J 50/10* (2016.02)

(58) Field of Classification Search
CPC ......... B60L 11/182; B60L 53/12; H02J 7/042; H02J 7/025; H02J 50/10; H02J 7/0088
See application file for complete search history.

(56) References Cited

U.S. PATENT DOCUMENTS

2011/0057606 A1* 3/2011 Saunamaki ............ H02J 7/025
320/108
2012/0249449 A1 10/2012 Tseng et al.
(Continued)

FOREIGN PATENT DOCUMENTS

EP 2803522 A1 11/2014
WO 2013089458 A1 6/2013
(Continued)

OTHER PUBLICATIONS

"Advanced Power Control Scheme in Wireless Power Transmission for Human Protection From EM Field", Seong-Min Kim, Jung-Ick, In-Kui Cho, Jae-Hun Yoon, Woo-Jin Byun and Hyun-Chul Choi, IEEE Mar. 3, 2015.*

(Continued)

*Primary Examiner* — Nha T Nguyen
(74) *Attorney, Agent, or Firm* — Schwabe, Williamson & Wyatt, P.C.

(57) ABSTRACT

Embodiments of the present disclosure provide techniques and configurations for controlled power level adjustment of a wireless charging apparatus. In one instance, the apparatus may comprise a charging module to radiate an electromagnetic field to wirelessly charge an electronic device in proximity to the wireless charging apparatus; and a control module communicatively coupled with the charging module to adjust a power level of the electromagnetic field, radiated by the charging module, in response to a determination of an environmental condition in relation to the wireless charging apparatus. The control module may be configured to receive information indicative of the environmental condition from multiple sources distributed between the apparatus and the electronic device, and make the determination based at least in part on the received information. The environmental condition may comprise a presence of human tissue in proximity to the wireless charging apparatus. Other embodiments may be described and/or claimed.

17 Claims, 8 Drawing Sheets

(51) Int. Cl.
*H02J 7/00* (2006.01)
*H02J 50/10* (2016.01)
*H02J 7/02* (2016.01)
*H02J 7/04* (2006.01)

(56) References Cited

U.S. PATENT DOCUMENTS

| | | |
|---|---|---|
| 2013/0069441 A1 | 3/2013 | Verghese et al. |
| 2013/0082651 A1* | 4/2013 | Park ........................ H02J 7/025 320/108 |
| 2013/0169348 A1 | 7/2013 | Shi |
| 2013/0342025 A1 | 12/2013 | Cook et al. |
| 2014/0049422 A1 | 2/2014 | Von Novak et al. |
| 2015/0048752 A1 | 2/2015 | Van Den Brink et al. |
| 2015/0102680 A1 | 4/2015 | Menegoli |
| 2017/0093229 A1 | 3/2017 | Sindia et al. |

FOREIGN PATENT DOCUMENTS

| | | |
|---|---|---|
| WO | 2014064489 A1 | 5/2014 |
| WO | 2015023092 A1 | 2/2015 |

OTHER PUBLICATIONS

International Search Report and Written Opinion dated Oct. 21, 2016, issued in corresponding International Application No. PCT/US2016/044222, 14 pages.

U.S. Appl. No. 14/866,571 filed Sep. 25, 2015, 28 pages.

EP Search Report, EP Application No. 16185143, dated Feb. 1, 2017, 7 pages.

Office Action dated Nov. 2, 2017 for U.S. Appl. No. 14/866,571, 14 pages.

\* cited by examiner

WIRELESS CHARGING APPARATUS WITH CONTROLLED POWER LEVEL ADJUSTMENT

FIELD

Embodiments of the present disclosure generally relate to the field of sensor-equipped devices, and more particularly, to wireless charging apparatuses.

BACKGROUND

A variety of wireless chargers is commonly used to charge electronic devices, for example user devices such as smartphones, tablet computers, "2 in 1" mobile computing devices, or wearable devices. Wireless chargers typically include induction chargers, which use an induction coil (sender (Tx) coil) to create an alternating electromagnetic field. A mating induction coil in the user device (receiver (Rx) coil) takes power from the electromagnetic field and converts it back into electrical current to charge the battery of the user device. The two induction coils in proximity may combine to form an electrical transformer. Greater distances between sender and receiver coils may be achieved when the inductive charging system uses resonant inductive coupling.

Parameters of electromagnetic fields created by wireless chargers may be subject to certain requirements in order to conform to interoperability standards and acceptable levels of user exposure. For example, international organizations such as Alliance for Wireless Power (A4WP) and Wireless Power Consortium (WPC), among others, define requirements for interoperability such as the frequency of operation, magnitude of fields, and power levels in wireless power systems. Regulatory bodies, such as the U.S. Federal Communications Commission (FCC) and International Commission on Non-Ionizing Radiation (ICNIRP), provide regulatory requirements for human exposure to radio frequency (RF) waves and electromagnetic radiation.

Current solutions may include wireless chargers with coils designed such that the power transfer may conform to the power levels defined by the wireless power (i.e. A4WP and WPC) standards, while also meeting the regulatory limits imposed by the FCC and others.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
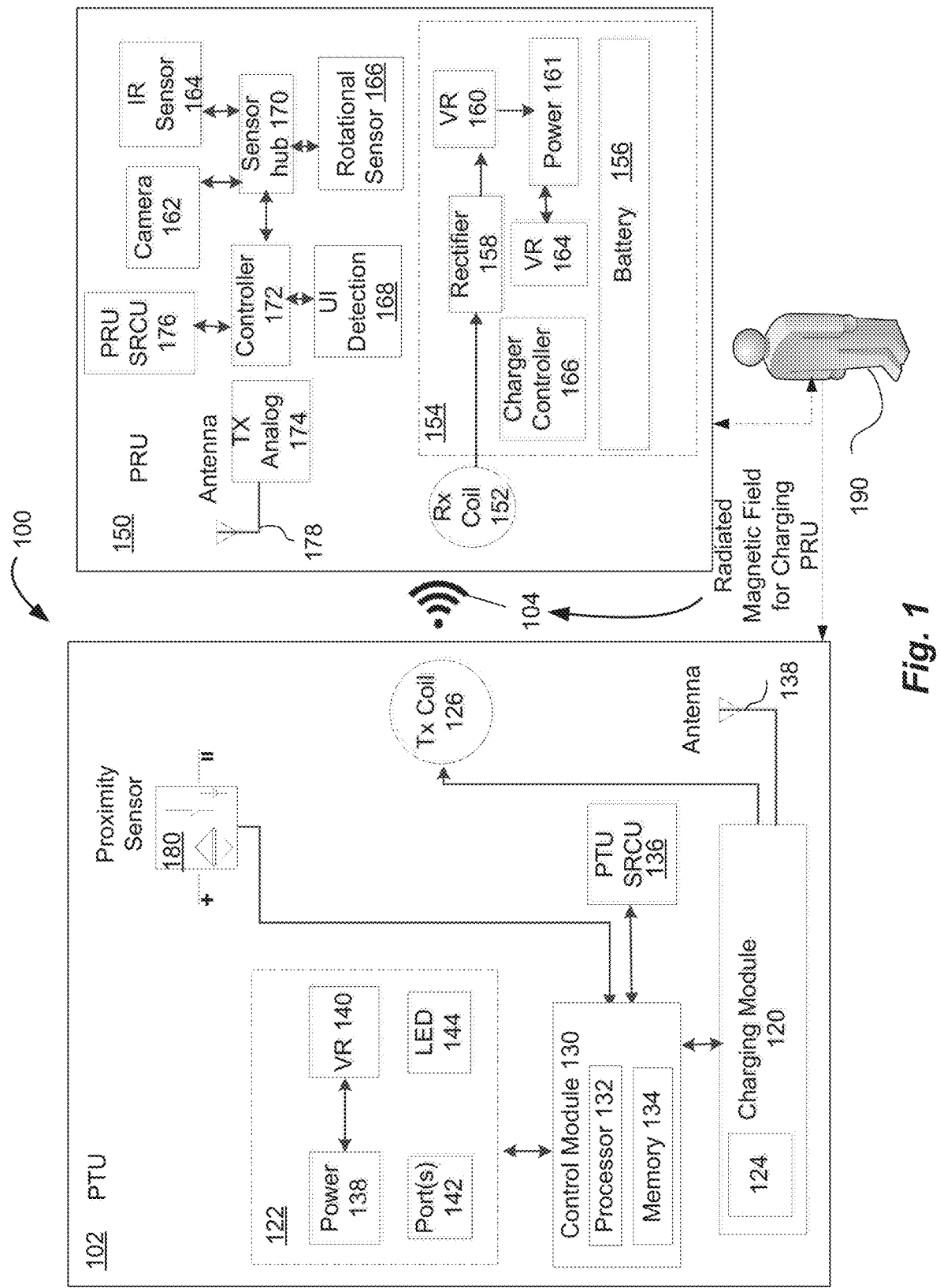
FIG. 1 is a block diagram illustrating an example wireless charging system 100 incorporated with the teachings of the present disclosure, in accordance with some embodiments.

Embodiments of the present disclosure include techniques and configurations for controlled power level adjustment of a wireless charging apparatus. In accordance with embodiments, the apparatus may comprise a charging module to radiate an electromagnetic field to wirelessly charge an electronic device in proximity to the wireless charging apparatus; and a control module communicatively coupled with the charging module to adjust a power level of the electromagnetic field, radiated by the charging module, in response to a determination of an environmental condition in relation to the wireless charging apparatus. The control module may be configured to receive information indicative of the environmental condition from multiple sources, such as various sensors or components distributed between the apparatus and the electronic device, and make the determination based at least in part on the received information. The environmental condition may comprise a presence of human tissue in proximity to the wireless charging apparatus.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 is a block diagram illustrating an example wireless charging system 100 incorporated with the teachings of the present disclosure, in accordance with some embodiments. As shown, the wireless charging system 100 may include a wireless charging apparatus 102, such as a power transmit unit (PTU) comprising, for example, a wireless pad or other wireless charging device configured to radiate an electromagnetic field 104, to wirelessly charge an electronic device 150 (also referred to as power receiving unit (PRU)) in proximity to the wireless charging apparatus 102. In some embodiments, the wireless charging apparatus 102 may include a charging module 120 configured to radiate electromagnetic field 104 using Tx coil 126 to wirelessly charge the electronic device 150. The charging module 120 may include circuitry 124 to operate the radiation of electromagnetic field 104 by the Tx coil 126. The circuitry 124 will be described in detail in reference to FIG. 2.

The wireless charging apparatus 102 may further include a control module 130 communicatively coupled with the charging module 120 and configured to regulate charging module 120 to adjust a power level of the electromagnetic field 104, radiated by TX coil 126, in response to a determination of an environmental condition in relation to the wireless charging apparatus 102, as will be described below in greater detail. The control module 130 may include a processor 132 and memory 134 having instructions that, when executed on the processor 132, may cause the processor 132 to perform tasks of the wireless charging system 100, some of which are described below in reference to FIGS. 3-7.

The wireless charging apparatus 102 may include other components 122 necessary for the functioning of the wireless charging apparatus 102. As shown, other components 122 may include a power supply unit 138 coupled with a voltage regulator (VR) 140, and one or more ports 142, e.g., communications interface(s) to enable the wireless charging apparatus 102 to communicate over one or more wired network(s) and/or with any other suitable device, such as electronic device 150. Other components 122 may further include light sources (e.g., light emission diodes (LED)) 144, and the like. The above-listed components of the other components 122 are described for illustration purposes only and are not limiting to this disclosure. The other components 122 may include more or fewer components than the ones described above, necessary for functioning of the wireless charging apparatus 102.

The wireless charging apparatus 102 may include wireless communications interface(s) to enable the wireless charging apparatus 102 to communicate over one or more wired network(s) and/or with any other suitable device, such as electronic device 150. For example, the wireless charging apparatus 102 may include a short-range communication unit (SRCU) 136, such as near field communication (NFC) or Bluetooth® communication device coupled with antenna 138.

Electronic device 150 may be any one of a number of PRU, and may comprise a mobile device (e.g., a tablet computer, a smartphone, a 1-in-2 computing device, and the like), a wearable device, or any other user device configured to accept wireless charge. Electronic device 150 may include an Rx coil 152 coupled with a power supply module 154. The power supply module 154 may include various components configured to enable power provision to electronic device 150, including wireless charging capabilities for a power supply source (e.g., battery) 156. For example, the power supply module 154 may include a rectifier 158 coupled with the Rx coil 152, one or more VR 160 and 164, power unit 161 to use the voltage output of the VR to power other VRs and other functional units on the PRU 150, and charger controller 166 configured to control power supply of the electronic device 150.

The above-listed modules of the power supply module 154 are described for illustration purposes only and are not limiting to this disclosure. The power supply module 154 may include more or fewer modules than the ones described above, necessary for functioning of the electronic device 150. Further, the electronic device 150 may include various modules and components necessary for functioning of the device 150, depending on a type of the device 150, which are not described herein for brevity purposes.

The wireless charging system 100 may include one or more (e.g., a plurality of) sources configured to collect and provide information indicative of an environmental condition that may be related to the wireless charging apparatus 102. These sources may include, but are not limited to, various sensors and other components configured to detect conditions associated with the wireless charging apparatus 102 and/or electronic device 150. The sources may be distributed throughout the system 100 in a number of different ways: some of the sources may be disposed in the wireless charging apparatus 102 and others may be disposed in the electronic device 150, as will be described below. In some embodiments, the sources may be disposed either on the wireless charging apparatus 102 or electronic device 150.

In example embodiments shown in FIG. 1, the sources of information may include: a camera 162, an infrared (IR) sensor 164, a rotational sensor 166 (e.g., accelerometer or gyroscope), and/or a user interaction detection component 168 configured to detect user activity associated with (e.g., user interaction with a user interface of) the electronic device 150.

In some embodiments, the sources of information may further include a proximity sensor 180 configured to monitor an environmental condition related to electronic device 150 or wireless charging apparatus 102, such as the presence of user 190 (and therefore the presence of human tissue), in proximity to the wireless charging apparatus 102 or electronic device 150, and to provide an output signal that indicates the proximity of human tissue to a respective device that is below a threshold distance, e.g., a distance that may be mandated by regulatory agencies to be safe. The proximity sensor 180 may comprise a capacitive proximity sensor configured to measure a change in capacitance (increase or decrease). Proximity to the sensor 180 or touch of the sensor by human body, hand or finger may cause a change in the dielectric constant of the capacitor that may be detectable.

As noted above, the sources of information may be distributed throughout the system 100 in different ways. For example, the proximity sensor 180 may be disposed in the wireless charging apparatus 102 as shown in FIG. 1, to provide an output signal that indicates the proximity of human tissue to the wireless charging apparatus 102 that is below the threshold distance, to the control module 130.

In some embodiments, the camera 162, IR sensor 164, rotational sensor 166, and user interaction detection component 168 may be disposed in the electronic device 150, as shown in FIG. 1, to provide information indicative of user 190's presence to a sensor hub 170. The sensor hub 170 may aggregate the provided information and submit the aggregated information to an electronic device control module 172 (which in embodiments may communicate the aggregated information or inferred environmental conditions from the aggregated information to PTU 102). It will be understood that the user 190's presence may be detected in a number of different ways. For example, the camera 162 may be turned on by the user 190, which may indicate user presence. The IR sensor 164 may detect IR radiation change associated with the user 190's presence. The rotational sensor 166 may detect a motion of the electronic device 150, which may indicate the user 190's presence in proximity to the electronic device 150. The user interaction detection component 168 may detect user 190's interaction with the electronic device 150, such as interaction with user interface components (not shown) of the electronic device 150. Information from at least one (or more, or all) of these sources may indicate the presence of the user 190 in proximity to the electronic device 150.

The electronic device control module 172 may be configured to collect, from the sources described above, via the sensor hub 170, e.g., on a continuous or periodic basis, information indicative of the environmental condition in relation to the electronic device 102. The environmental condition may be a presence of a user 190 (and therefore presence of human tissue) in proximity to the electronic device 102.

The electronic device control module 172 may be further configured to detect a presence of the wireless charging apparatus 102 proximate to the electronic device 150, and provide the collected information to the wireless charging apparatus 102 in response to the detection of the presence of the wireless charging apparatus 102 proximate to the electronic device 150.

The electronic device 150 may be configured to determine the presence of the wireless charging apparatus 102 in proximity to the device in a number of different ways. For example, the electronic device 150 may include a PRU SRCU 176 coupled with the control module 172, and further coupled with Tx analog module 174 (to conduct the analog preprocessing (like modulation and amplification) of the signal before feeding it to the antenna) and antenna 178. Accordingly, the electronic device 150 may be configured to detect the presence of the wireless charging apparatus 102, e.g., via PRU SRCU 176 and corresponding PTU SRCU 136, and initiate a handshake procedure with (or respond to a handshake of) the wireless charging apparatus 102, and establish a communication link. In response to the determination of the presence of the wireless charging apparatus 102, the electronic device 150 may communicate information collected from the sources disposed in the device 150 (e.g., 162, 164, 166, and 168) to the wireless charging apparatus 102 via the communication link established by PRU SRCU 176 and corresponding PTU SRCU 136.

It should be noted that sources of information indicative of the environmental condition are shown in FIG. 1 for illustration only and are not limiting the implementation of wireless charging system 100. It will be appreciated that any number or types of sensors or components may be used in the wireless charging system 100 to detect human tissue in proximity to the electronic device 150 and ultimately to the wireless charging apparatus 102. For example, a microphone may be disposed either on the wireless charging apparatus 102 or electronic device 150 to capture audio associated with the user 190, and a determination of the user 190's presence in proximity to the wireless charging apparatus 102 may be made accordingly.

The above-described distribution of sources of information throughout the wireless charging system 100 is described for illustrative purposes only. In some embodiments, at least some of the sources, such as camera 162 and/or IR sensor 164 may be disposed on the wireless charging apparatus 102 in order to detect the presence of the user 190 (and therefore the presence of human tissue) in proximity to the wireless charging apparatus 102 that may be below a safety threshold. It should be noted that for the proximity sensor to trigger, a safety threshold may be required. As described herein, even in the event of no trigger from the proximity sensor, the additional sensors, such as IR, camera, etc., may detect and trigger an indication of the presence of human tissue.

In some embodiments, the proximity sensor 180 may be disposed in the electronic device 150 to provide an output signal that indicates proximity of human tissue to the electronic device 150 that may be, for example, below a user-to-electronic device threshold distance. As described above, this indication, alone or in combination with information collected from other sources of information disposed in the electronic device 150, may be provided to the control module 130 of the wireless charging apparatus 102. The electronic device 150 may also communicate to the wireless charging apparatus 102 information that indicates a presence of the electronic device 150 in proximity to the wireless charging apparatus 102 (e.g., via handshake). The information indicating the proximity of the electronic device 150 to the wireless charging apparatus 102, in combination with information indicating the proximity of human tissue to the electronic device 150, may serve as an indication to the control module 130 that a user 190 is in fact present in proximity (e.g., below a safety threshold) to the wireless charging apparatus 102.

The control module 130 of the wireless charging apparatus 102 may have hardware or software implementation, or a combination thereof. The control module 130 may be configured to receive information indicative of an environmental condition in relation to the apparatus 102 (e.g., the presence or absence of human tissue in proximity to the apparatus 102) from multiple sources described above, and make a determination about the environmental condition, based at least in part on the received information. The control module 130 may be further configured, in response to this determination, to adjust a power level of the electromagnetic field 104 radiated by the charging module 120 of the apparatus 102, to a desired power level, such as mandated power level.

For example, the charging module 120 of the wireless charging apparatus 102 may cause the electromagnetic field 104 to radiate at a default (first) power level. The control module 130 of the apparatus 102 may determine, based at least in part on the received information, whether the human tissue is present in the proximity to the wireless charging apparatus 102, e.g., that may be below a threshold (safe) distance. The control module 130 may further cause the charging module 120 to switch the radiation of the electromagnetic field 104 from the default (first) power level to a second power level (different than default power level), or to keep the radiation substantially at the default power level, based at least in part on a result of the determination.

For example, the control module 130 may determine that the human tissue is present in proximity to the wireless charging apparatus 102 (e.g., at a distance that is below the threshold distance). In some embodiments, in addition to the above determination, the control module 130 may further determine that human tissue is present in proximity to apparatus 102 for a period of time that may be greater than an exposure time threshold. Accordingly, the control module 130 may switch the radiation of the electromagnetic field 104 to the second power level that may be lower than the first power level. For example, the second power level may be health-safe, e.g., within output signal power range mandated by governmental regulatory agencies (e.g., FCC or CE) for mobile devices, in order to reduce or eliminate the risk of bodily injury of the user 190 of the wireless charging system 100 due to continuous exposure to electromagnetic waves associated with the electromagnetic field 104.

In embodiments, the exposure time threshold and safe distance threshold may vary depending on the charging apparatus type, method of use, user preferences, particular market segment, and other factors.

A reduction of the power level of the radiated electromagnetic field to mandated limits instead of shutdown of the charging process may mitigate the effect of false triggering of the proximity sensor 180. It is known that proximity sensors may indicate a proximity event when there is no actual event (false positive). Empirically, false positives may occur more often than proximity sensors' failures to trigger when there is a proximity event (false negative). Accordingly, the power level of the radiated field may be reduced to the federally mandated limits, to provide for efficient charging of the electronic device 150.

In another example, the control module 130 may determine that that the human tissue is not present in proximity to the wireless charging apparatus 102 (e.g., at a distance that is below the threshold safe distance). Accordingly the control module 130 may keep the power level at a first (default) power level, or switch the power level to a second power level that may be greater than the first (default) power level. The latter case provides for boosting the charging of the electronic device 150 at increased power levels ("turbo charging mode") in the absence of proximity of the user 190 to the wireless charging apparatus 102, enabling efficient charging of the electronic device 150.

As described above, the control module 130 may receive information indicative of the absence or presence of human tissue in proximity to the wireless charging apparatus 102 from multiple heterogeneous sources of information, including various sensors or components disposed throughout the system 100 (not shown). The provision of information from multiple sources may ensure robust (e.g., high-probability) determination of user (human tissue) presence or absence near the wireless charging apparatus. For example, the control module 130 may poll the output signals from the sensors 180, 162, and 164, and user interaction detection component 168 at least over the threshold time period and determine respective statuses of the sensors based at least in part on a result of the poll.

The control module 130 may be configured to make a determination as to whether human tissue is present in proximity to the wireless charging apparatus 102, based on the information provided from the heterogeneous sources. For example, the control module 130 may resolve that human tissue is present in proximity to the wireless charging apparatus 102, based on information that may indicate the presence of human tissue from at least one (e.g., just one) of available sources of information, while other sources may or may not provide such indication. The process of making a determination of a presence of the environmental condition in relation to the wireless charging apparatus 102 is described below in reference to FIG. 7.

Figure 2:
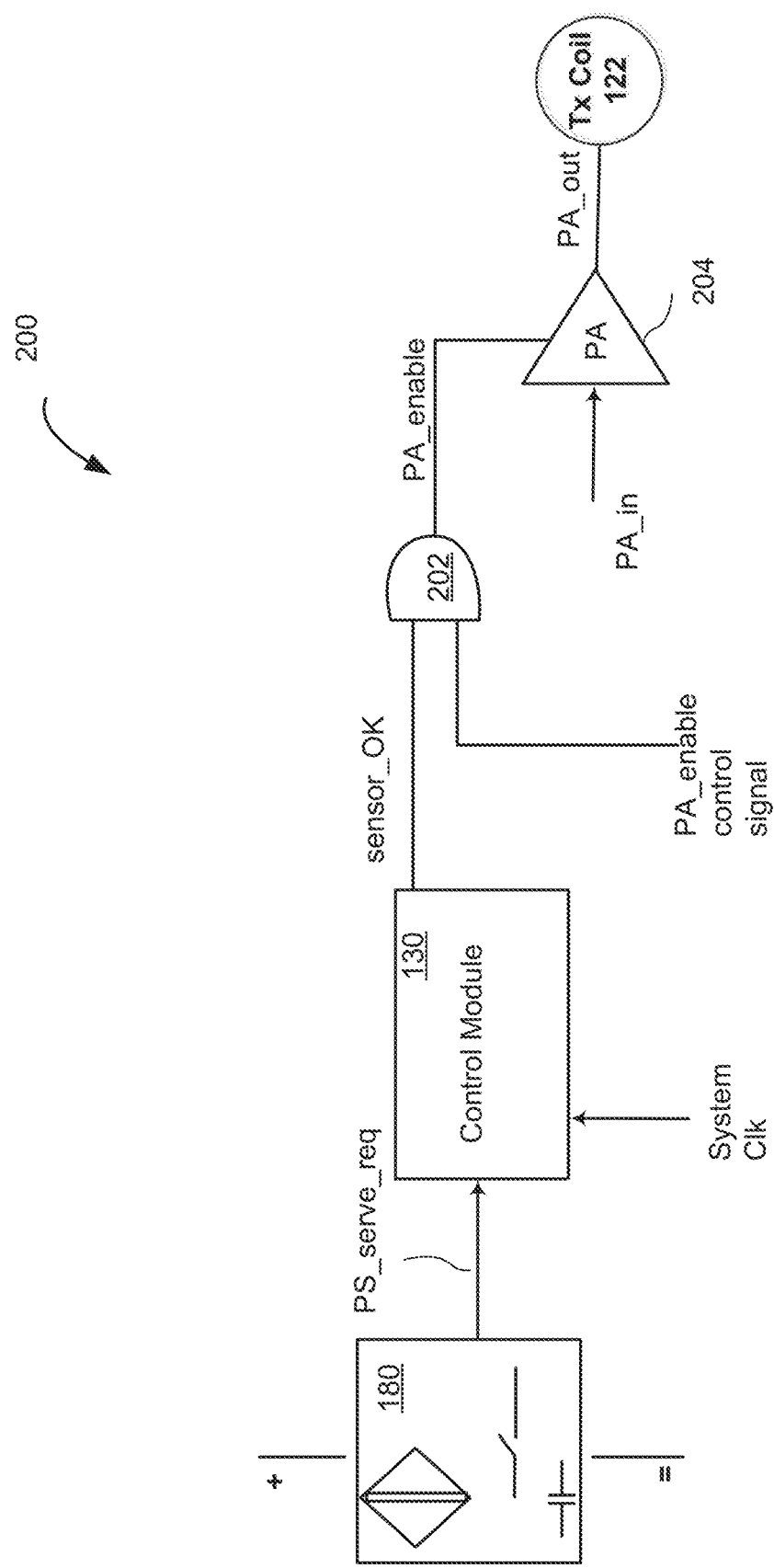
FIG. 2 is a schematic diagram of an example of at least partial implementation of the wireless charging apparatus of FIG. 1, in accordance with some embodiments.

FIG. 2 is a schematic diagram of an example of at least partial implementation 200 of the wireless charging apparatus 102 of FIG. 1, in accordance with some embodiments. More specifically, the schematic diagram of FIG. 2 illustrates at least portions of the charging module 120 (e.g., circuitry 124) configured to operate the Tx coil 126 under control of the control module 130. For simplicity purposes, like components of FIGS. 1 and 2 may be enumerated with like numerals.

As described in reference to FIG. 1, the proximity sensor 180 may be coupled with a logic circuit, such as control module 130, to monitor sensor 180 status. The proximity sensor 180 may provide an output signal indicating the presence of human tissue, Proximity Sensor Service Request (PS_serv_req), to the control module 130. The control module 130 may sense the capacitance change by polling the output of the signal conditioning circuitry (not shown) that processes the output of the proximity sensor 180, such as for signal amplification, filtering noise, and the like. A status of the sensor 104 may be indicated by a state of PS_serve_req signal (e.g., logical high or logical low). If the signal state remains the same over a period of time (clocked by system clock as shown), the control module 130 may provide a signal sensor_OK to an AND logic gate 202, in order to control the gain of a power amplifier (PA) 204 that drives charging current into the Tx coil 126 upon the receipt of the PS_serv_req signal from the proximity sensor 180. Another input signal to the AND logic gate 202 may be a PA_enable control signal.

In embodiments, the PA_enable control signal may be a function of PS_serv_req. For example, if the proximity sensor 180 is in a working state, then the signal sensor_OK may be a logical high. When human tissue comes close to the proximity sensor 104, the sensor 104 may detect a proximity event and issue a PS_serv_req signal. The proximity event may be a presence of human tissue at an unsafe distance to the wireless charging apparatus 102. The active state of the PS_serv_req signal may be needed to disable the power amplifier 204. Accordingly, the PA_enable control signal at the input of the AND logic gate 202 may be an inverse function of the PS_serv_req signal.

In the absence of a detection of a proximity event by the sensor 104 over the time period below the threshold, the control module 130 may issue a sensor_OK signal, to enable the passing of the PA_enable signal to the power amplifier 124. The PA_enable signal may control the input communication signal PA_in to be amplified by the power amplifier 204, to produce an output signal PA_out that may drive the Tx coil 126.

For example, a change from a logical high state to a logical low state of PS_serve_req (or vice versa) may indicate a detection of a proximity event by the sensor 104. This control module 130 may send the signal sensor_OK to the AND logic gate 202, which in turn may gate the PA_enable signal. If no proximity event has been detected over the time period above the threshold, the sensor_OK signal may gate the PA_enable signal from passing to the power amplifier 204 and enabling provision of the PA_out signal to the Tx coil 126. The threshold time period may be counted by the control module 130 using, for example, a system clock, via a signal System Clk as shown in FIG. 2.

The PA_enable signal may control the power gain (e.g., charging current) provided by the power amplifier 204 to the Tx coil 126. In the example illustrated in FIG. 2, the PA_enable signal, if gated, may shut off the power amplifier 204. In the presence of human tissue, the change in capacitance of the sensor 180 may likely be higher than the threshold capacitance ($\Delta C_{th}$) that may be calibrated to a value that is prevailing in the absence of human tissue at maximum load. Accordingly, the change in capacitance as detected by the proximity sensor 180 may be due to the presence of human tissue and not due to the increased load of a larger receiving device (e.g., a notebook instead of a mobile phone). Whenever the change in the detected capacitance is higher than a threshold $\Delta C_{th}$, the control module 130 may turn the PA 204 gain low, thereby driving lower current into the Tx coil 126. A reduced drive current into the Tx coil 126 may enable a maintenance of the electromagnetic wave exposure produced by the Tx coil 126 below the regulatory limits. In general, reducing the power into the Tx coil may also reduce the radiated electromagnetic field including the magnetic field.

The control module 130 of the wireless charging apparatus 102 of FIG. 1 may be configured to adjust a power level of the electromagnetic field 104, radiated by the charging module 120, in response to a determination of the presence or absence of human tissue in proximity to the wireless charging apparatus 102, in a number of different ways. For example, a power level adjustment may depend in part from an initial power level at which the wireless charging apparatus 102 may operate the Tx coil 126. As described in reference to FIG. 2, the power level of the electromagnetic field generated by the Tx coil 126 corresponds to a charging current provided by the charging module 120, under control of the control module 130, to the Tx coil 126. The examples described in reference to FIG. 1 referenced a first (default) power level and a second power level, to which the first power level may be adjusted as needed.

In some embodiments, initial power level at which a wireless charging apparatus may begin to operate may be a default power level, e.g., a pre-determined middle power level.

In some embodiments, the initial power level may be a reduced power level, e.g., a level that is lower than a pre-determined middle power level. The reduced power level may be a safe power level, e.g., a level within the mandated power limits for the electronic devices as described above. For example, the wireless charging apparatus may be configured to begin charging the electronic device at a reduced power level, based on a supposition that a user of the electronic device may be in proximity to the wireless charging apparatus and may be subjected to radiation of the electromagnetic field produced by the wireless charging apparatus.

In some embodiments, the initial power level may be an increased or "boosted" power level e.g., a level that is higher than a pre-determined middle power level. For example, the wireless charging apparatus may be configured to begin charging the electronic device at increased power level (referenced above as "turbo charging mode"), based on a supposition that the user of the electronic device may not be present in proximity to the wireless charging apparatus.

FIGS. 3-7 illustrate different examples of power adjustment processes performed by a control module of the wireless charging apparatus in accordance with some embodiments.

Figure 3:
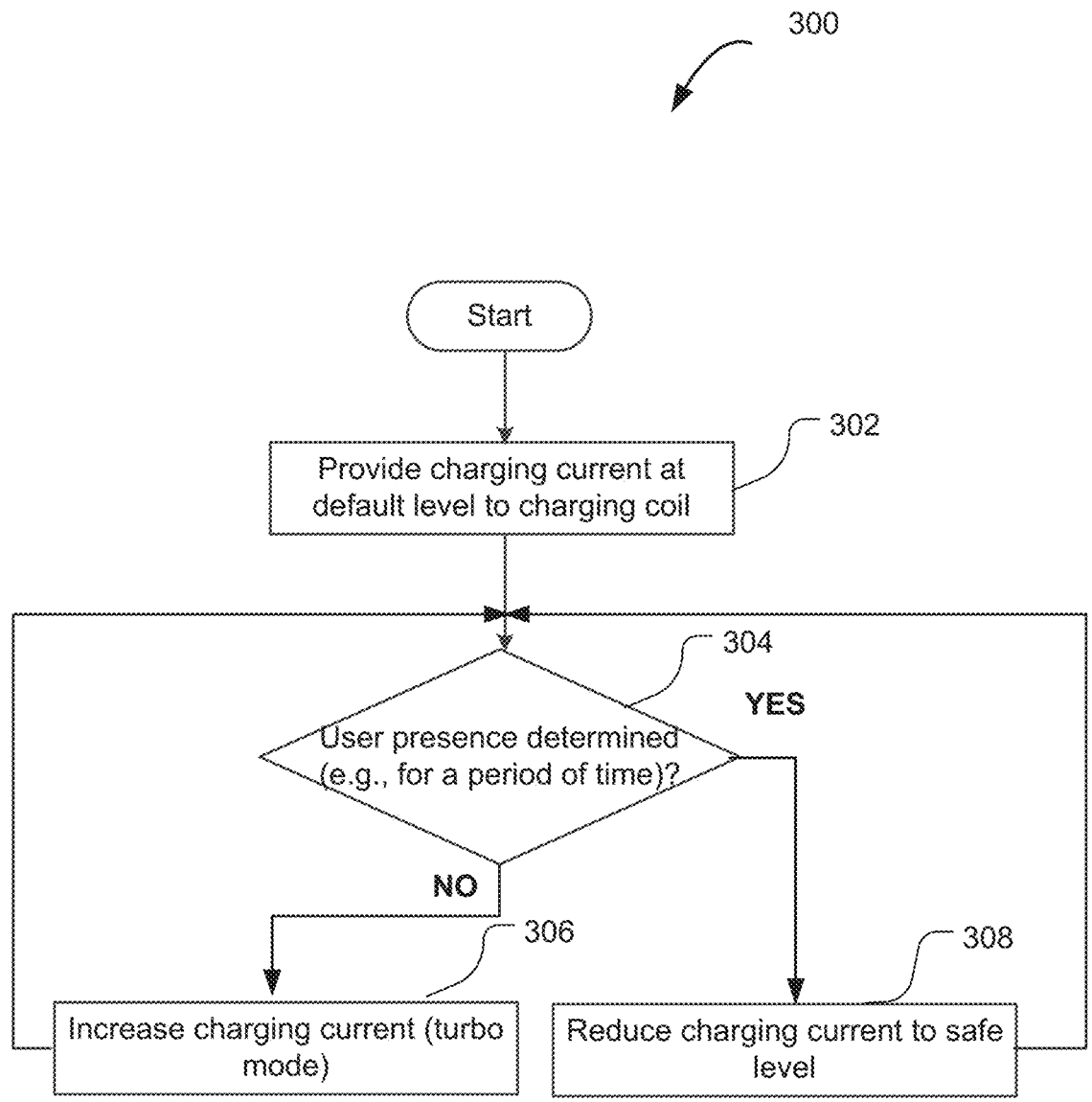
FIG. 3 is an example process flow diagram for power level adjustment of a wireless charging apparatus configured to begin a charge process by generating an electromagnetic field at a default power level, in accordance with some embodiments.

FIG. 3 is an example process flow diagram for power level adjustment of a wireless charging apparatus configured to begin charge process by generating an electromagnetic field at a default power level, in accordance with some embodiments.

The process 300 may begin at block 302, at which the control module may operate the wireless charging apparatus to provide charging current at default level to the Tx coil of the wireless charging apparatus, enabling a default power level of electromagnetic field generated by the Tx coil.

At decision block 304, the control module may determine whether user presence in proximity to the wireless charging apparatus has been detected. As described in reference to FIG. 1, the control module may determine whether the user (human tissue) has been present in proximity to the wireless charging apparatus for a period of time that is greater than a threshold time period.

If the user presence has not been determined, at block 306 the control module may cause the charging current to increase, enabling a turbo charging mode of the wireless charging apparatus. If the user presence has been determined, at block 308 the control module may reduce the charging current to enable a safe power level of the electromagnetic field generated by the Tx coil of the wireless charging apparatus. Subsequently, the process 300 may return to decision block 304, to initiate the user presence determination, e.g., after a determined time passes from the power level adjustment performed at blocks 306 or 308.

Figure 4:
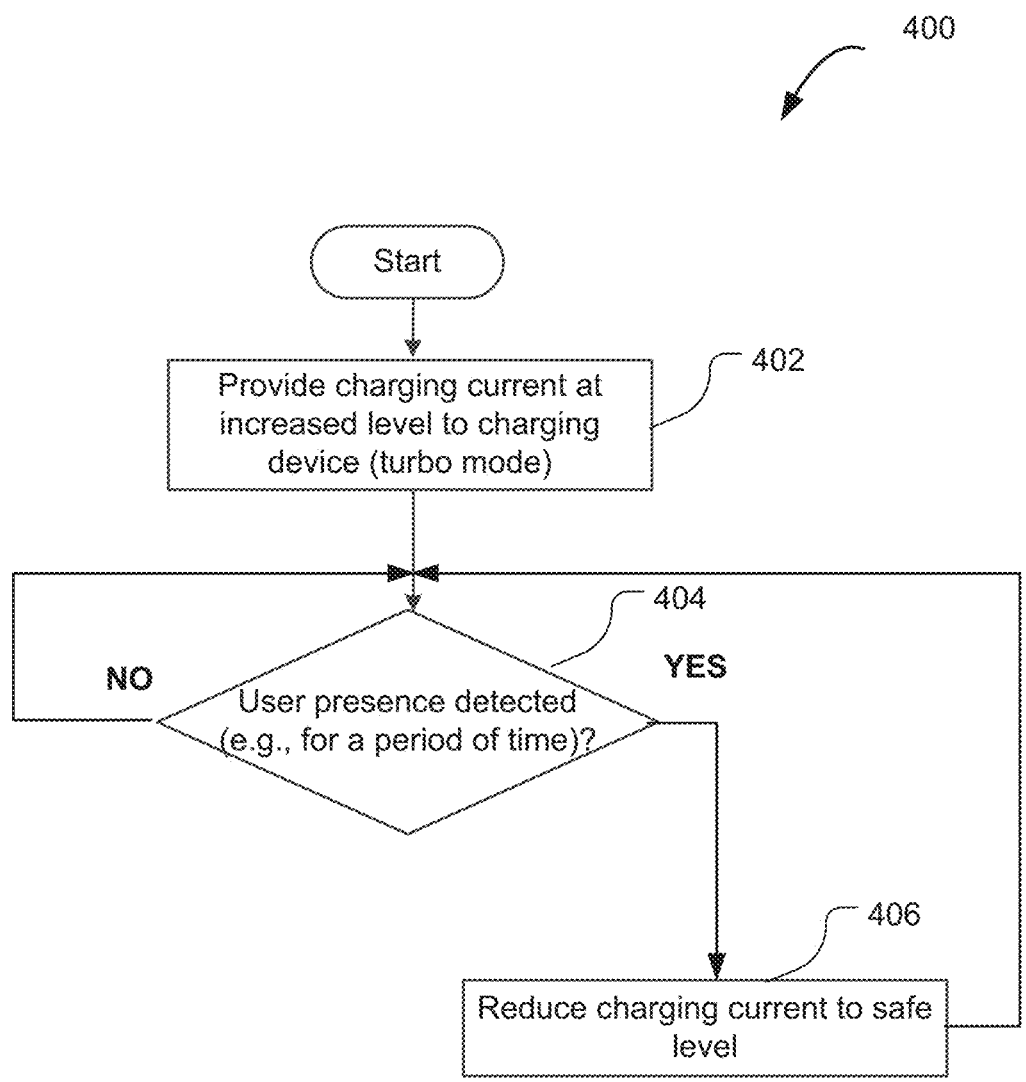
FIG. 4 is an example process flow diagram for power level adjustment of a wireless charging apparatus configured to begin a charge process by generating an electromagnetic field at an increased power level, in accordance with some embodiments.

FIG. 4 is an example process flow diagram for power level adjustment of a wireless charging apparatus configured to begin a charge process by generating an electromagnetic field at an increased power level, in accordance with some embodiments.

The process 400 may begin at block 402, at which the control module may operate the wireless charging apparatus to provide charging current at an increased level to the Tx coil of the wireless charging apparatus, enabling a turbo charging mode of the wireless charging apparatus.

At decision block 404, the control module may determine whether user presence in proximity to the wireless charging apparatus has been detected. As described in reference to FIG. 1, the control module may determine whether the user (human tissue) has been present in proximity to the wireless charging apparatus for a period of time that is greater than a threshold time period.

If the user presence has not been determined, the process 400 may return to decision block 404, to initiate the user presence determination, e.g., after a determined time period. If the user presence has been determined, at block 406 the control module may reduce the charging current to enable a safe power level of the electromagnetic field generated by the Tx coil of the wireless charging apparatus. Subsequently, the process 400 may return to decision block 404.

Figure 5:
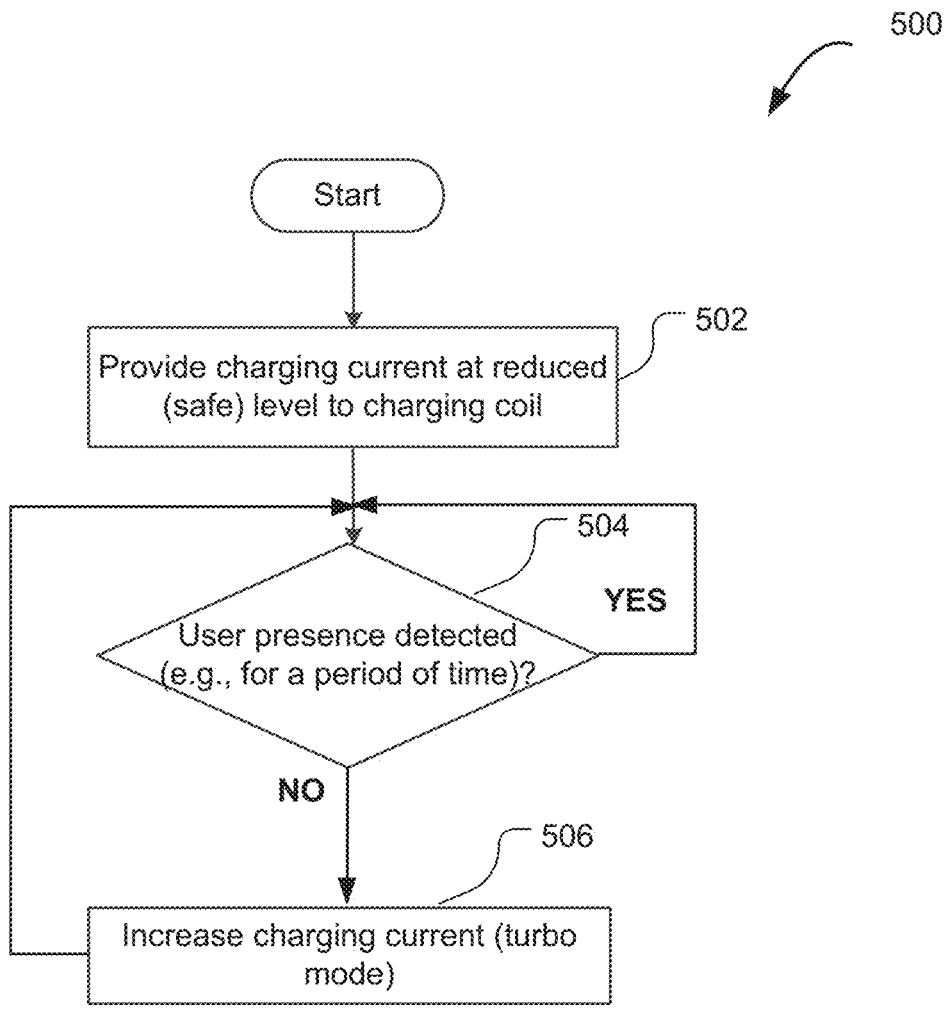
FIG. 5 is an example process flow diagram for power level adjustment of a wireless charging apparatus configured to begin a charge process by generating an electromagnetic field at increased power level, in accordance with some embodiments.

FIG. 5 is an example process flow diagram for power level adjustment of a wireless charging apparatus configured to begin a charge process by generating electromagnetic field at increased power level, in accordance with some embodiments.

The process 500 may begin at block 502, at which the control module may operate the wireless charging apparatus to provide charging current at a reduced level to the Tx coil of the wireless charging apparatus, enabling a safe charging mode of the wireless charging apparatus.

At decision block 504, the control module may determine whether user presence in proximity to the wireless charging apparatus has been detected. As described in reference to FIG. 1, the control module may determine whether the user (human tissue) has been present in proximity to the wireless charging apparatus for a period of time that is greater than a threshold time period.

If the user presence has not been determined, the process 500 may return to decision block 504, to initiate the user presence determination, e.g., after a determined time period. If the user presence has been determined, at block 506 the control module may cause the charging current to increase, enabling a turbo charging mode of the wireless charging apparatus. Subsequently, the process 500 may return to decision block 504.

Figure 6:
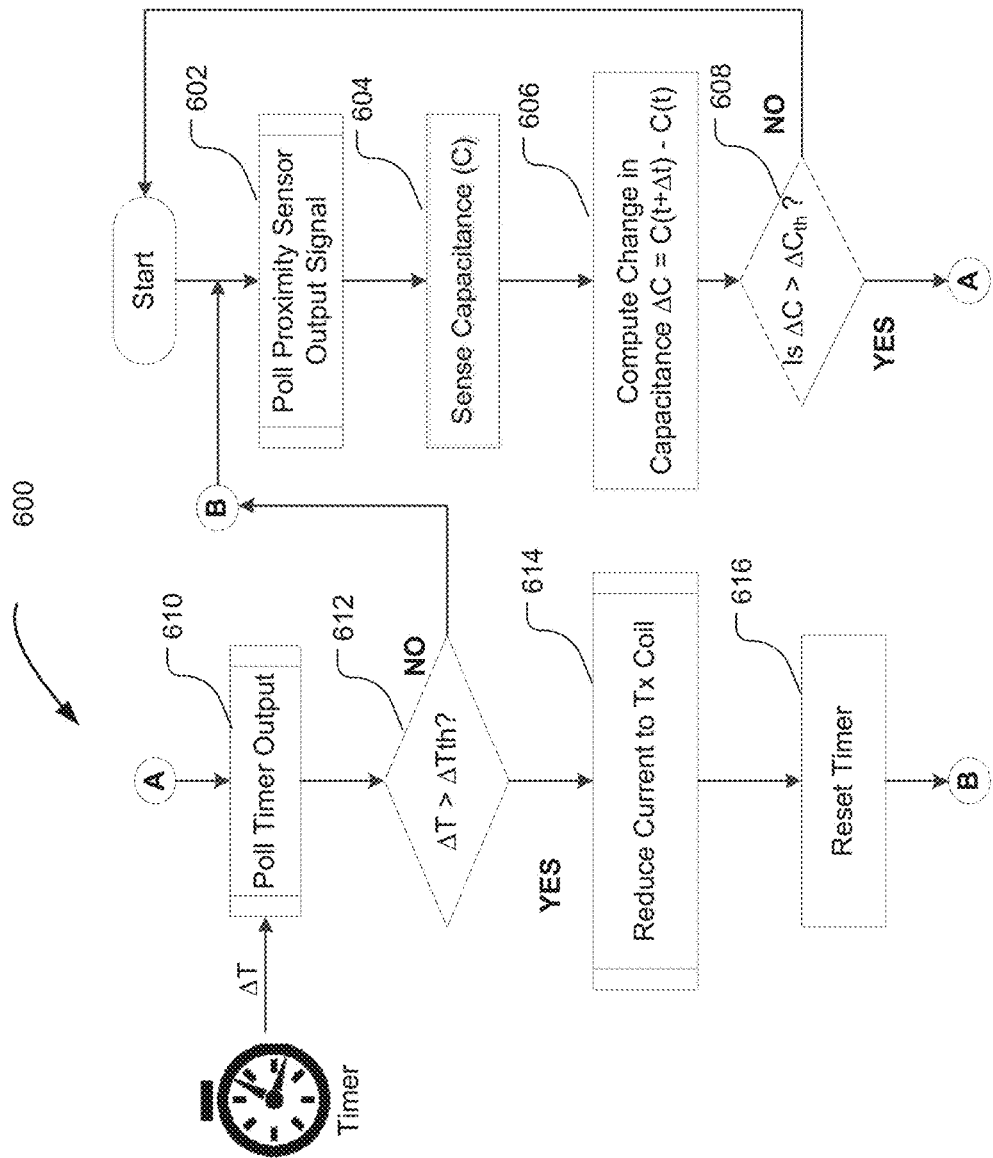
FIG. 6 is an example process flow diagram for power level adjustment of a wireless charging apparatus, in accordance with some embodiments.

FIG. 6 is an example process flow diagram for power level adjustment of a wireless charging apparatus, in accordance with some embodiments. The process 600 may comport with some of the apparatus embodiments described in reference to FIGS. 1-2. In alternate embodiments, the process 600 may be practiced with more or fewer operations, or a different order of the operations. In embodiments, the process 600 may be implemented as a control module 130 of FIGS. 1 and 2. More specifically, the process 600 describes the operation of the control module 130 in relation to the proximity sensor 180 that may be disposed in the wireless charging apparatus 100, as described in reference to FIGS. 1-2.

The process 600 may begin at block 602 and include polling of the proximity sensor 180 of FIG. 2 for the output signal (e.g., signal PS_serv_req described in reference to FIG. 2).

At block 604, the process 600 may include sensing capacitance (C) of the proximity sensor 180, in response to a receipt of the output signal from the proximity sensor 180.

At block 606, the process 600 may include computing change in capacitance that may occur in response to a presence of human tissue to the proximity sensor 180. For example, change in capacitance may be calculated as follows: Capacitance $\Delta C = C(t+\Delta t) - C(t)$, where $C(t+\Delta t)$ and $C(t)$ are capacitance values in consecutive increments of time $\Delta t$.

At decision block 608, the process 600 may include determining whether the computed change in capacitance $\Delta C$ is above a threshold capacitance $\Delta C_{th}$ described in reference to FIG. 2.

If it is determined at block 608 that the computed change in capacitance $\Delta C$ is equal to or below the threshold capacitance $\Delta C_{th}$, this may indicate that no human tissue has been detected by the proximity sensor 180. Accordingly the process 600 may return to block 602.

If it is determined at block 608 that the computed change in capacitance $\Delta C$ is above the threshold capacitance $\Delta C_{th}$, this may indicate that human tissue has been detected by the proximity sensor 180. Accordingly, at block 610, the process may include polling time output $\Delta T$ (e.g., time from the detected proximity event), to determine whether a predetermined threshold time period $\Delta T_{th}$ has been reached. For example, as shown in FIG. 2, the control module 130 may receive inputs of a timer, indicated by signal System Clk.

At decision block 608, the process 600 may include determining whether $\Delta T > \Delta T_{th}$, e.g., whether the threshold time period $\Delta T_{th}$ has been reached.

Polling time output for a threshold time period $\Delta T_{th}$ may enable adaptive control of a charging power level provided by the wireless charging apparatus. More specifically, by monitoring the time lag between proximity events, the duration and magnitude of current used for charging the Tx coil at a certain power level may be adaptively controlled. For example, when a user may be in proximity to wireless charging apparatus (e.g., sitting at her desk) for longer than a threshold time period $\Delta T_{th}$, the user exposure to the electromagnetic field produced by the wireless charging apparatus may be limited by reducing the current driven into the Tx coil. Conversely, when the user is present at her desk while charging her electronic device for duration of time below the threshold time period $\Delta T_{th}$, the charging current may not need to be reduced.

If it is determined at block 612 that the threshold time period $\Delta T_{th}$ has not been reached, the process 600 may return to block 602, to continue monitoring the proximity sensor 180 output. To continue with above example, if the user leaves her electronic device to charge and walks away from it, the proximity sensor 180 may detect the absence of the user (human tissue) and either leave the charging current at the same level (as described by the process 600), or increase the charging current, to enable the turbo charging mode described in reference to FIGS. 3-5.

If it is determined at block 612 that the threshold time period $\Delta T_{th}$ has been reached, at block 614 the charging current to Tx coil may be reduced to limit the radiated electromagnetic field to levels that may be in compliance with the regulatory requirements, as described in reference to FIGS. 3-5.

At block 616 the process 600 may include resetting the timer to its initial value, after which the process 600 may return to block 602.

As described in reference to FIG. 1, information indicative of an environmental condition in relation to a wireless charging apparatus, such as the presence of human tissue in proximity to the wireless charging apparatus (e.g., below a threshold) may be provided by various heterogeneous sources of information distributed throughout the wireless charging apparatus and/or electronic device comprising the wireless charging system.

Accordingly, depending on the number of sources of information used, the control module of the wireless charging apparatus may be configured with different techniques for determination of an environmental condition, such as human tissue presence in proximity to the wireless charging apparatus. In general, the presence of human tissue in proximity to the wireless charging apparatus that is below a threshold may be determined based on information that may indicate the presence of human tissue from at least one of available sources of information. For example, the presence of human tissue in proximity to the wireless charging apparatus 102 that is below a threshold may be determined based on information that indicates the presence of human tissue provided by one of all available sources of information, or two of the available sources of information, and so on. The determination of the presence of human tissue with highest probability may be made based on information indicative of the presence of human tissue that may be provided by all available sources of information.

Figure 7:
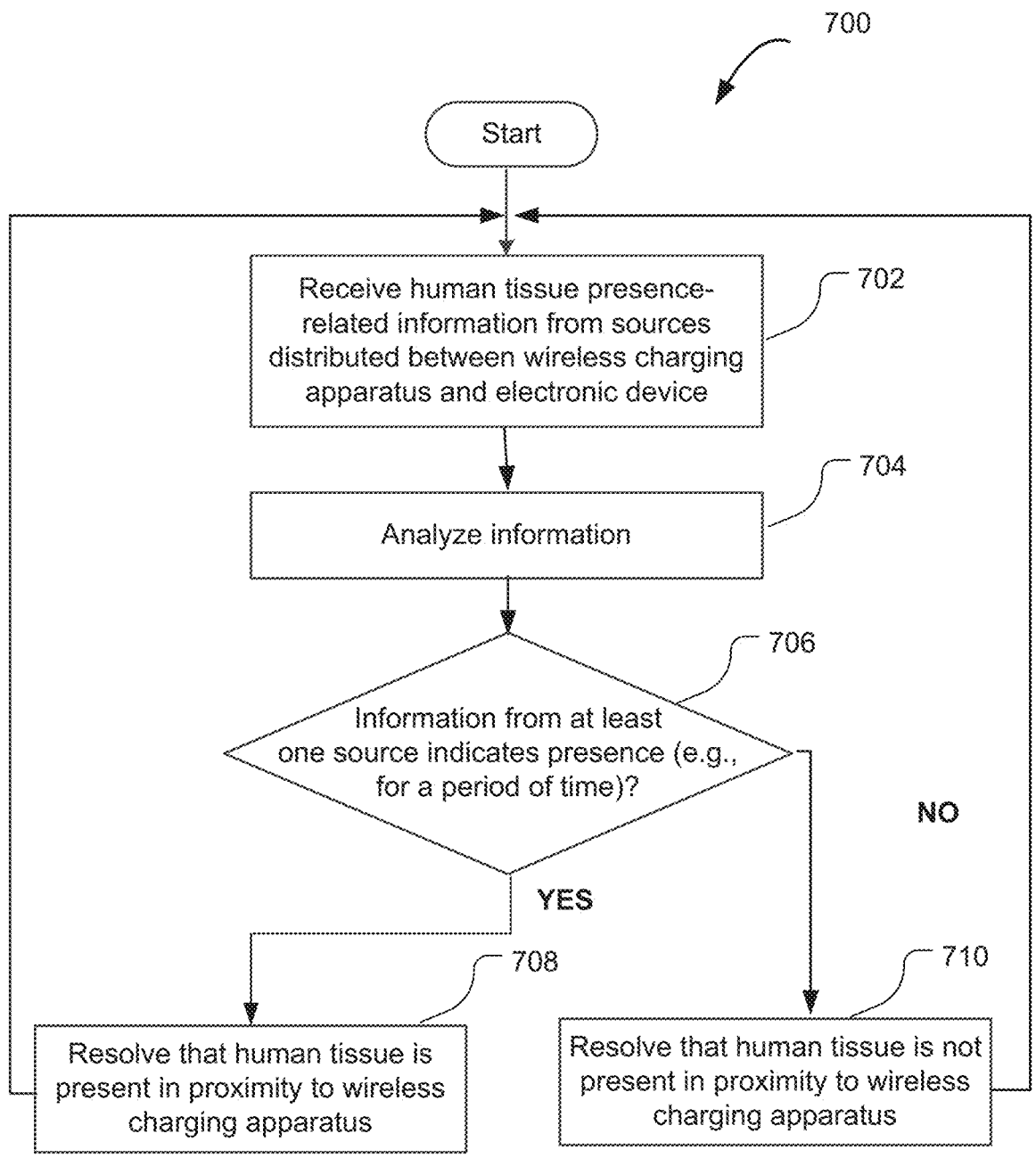
FIG. 7 is an example process flow diagram for determining a presence or absence of an environmental condition in relation to a wireless charging apparatus, in accordance with some embodiments.

FIG. 7 is an example process flow diagram for determining a presence or absence of an environmental condition in relation to a wireless charging apparatus, in accordance with some embodiments. The process 700 may comport with some of the apparatus embodiments described in reference to FIGS. 1-2. In alternate embodiments, the process 700 may be practiced with more or fewer operations, or a different order of the operations. In embodiments, the process 700 may be implemented as a control module 130 of FIGS. 1 and 2.

The process 700 may begin at block 702, and include receiving human tissue presence-related information from multiple sources distributed between the wireless charging apparatus and electronic device of the wireless charging system described in reference to FIG. 1.

At block 704, the process 700 may include analyzing information provided by the multiple sources. For example, the control module may calculate capacitance provided by the proximity sensor as described in reference to FIGS. 2 and 6. The control module may further analyze indications of human tissue presence (or absence) provided by various sources, such as IR sensor (e.g., change in IR radiation due to human presence), camera (e.g., camera manipulations by the user), audio (e.g., user's voice captured by a microphone), user interaction with the electronic device captured by the user interaction detection component, and/or electronic device's motion associated with the user's manipulations, as described in reference to FIG. 1.

At decision block 706, the process 700 may determine whether at least one of the available sources provided information that may indicate user presence in proximity to the wireless charging apparatus (e.g., for a time period as described in reference to FIG. 6).

If at least one of the available sources provided information that indicates user presence in proximity to the wireless charging apparatus, at block 708 the process 700 may include making a resolution that human tissue is present in proximity to wireless charging apparatus. If none of the available sources provided information that indicates user presence in proximity to the wireless charging apparatus, at block 708 the process 700 may include making a resolution that human tissue is not present in proximity to wireless charging apparatus. The process 700 may return to block 702 after the resolutions of block 708 or 710 have been made.

Figure 8:
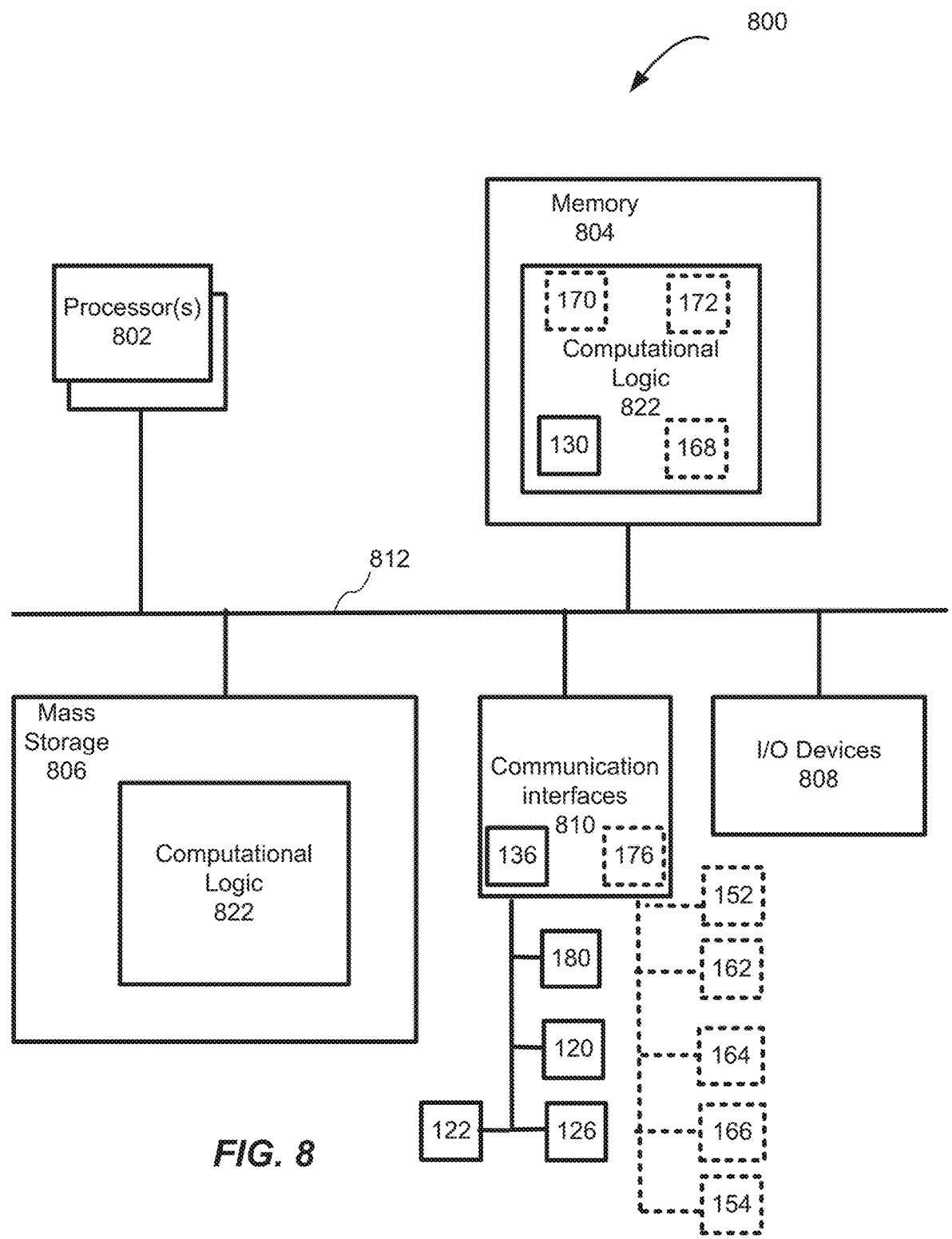
FIG. 8 is an example computing device suitable to be configured as the apparatuses of FIGS. 1-7 in accordance with various embodiments.

FIG. 8 is an example computing device 800 suitable to be configured as the apparatuses of FIGS. 1-7 in accordance with various embodiments. In some embodiments, various components of the example computing device 800 may be used to configure components of the wireless charging system 100, for example, the wireless charging apparatus 102 or electronic device 150 of FIG. 1. For illustration purposes, some of the components of the electronic device 150 of FIG. 1 that may comprise the computing device 800 are shown in boxes indicated with dashed lines, and some of the components of the wireless charging apparatus 102 of FIG. 1 that may comprise the computing device 800 are shown in boxes indicated with full lines.

As shown, computing device 800 may include one or more processors or processor cores 802 and system memory 804. For the purpose of this application, including the claims, the terms "processor" and "processor cores" may be considered synonymous, unless the context clearly requires otherwise. The processor 802 may include any type of processors, such as a central processing unit (CPU), a microprocessor, and the like. The processor 802 may be implemented as an integrated circuit having multi-cores, e.g., a multi-core microprocessor. The computing device 800 may include mass storage devices 806 (such as solid state drives, volatile memory (e.g., dynamic random-access memory (DRAM), and so forth)). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. System memory 804 and/or mass storage devices 806 may include respective copies of programming instructions configured to perform operations related to wireless charging system 100, for example, collectively denoted as computational logic 822.

The computing device 800 may further include input/output (I/O) devices 808 (such as a display, soft keyboard, touch sensitive screen, image capture device, and so forth) and communication interfaces 810 (such as network interface cards, modems, infrared receivers, radio receivers (e.g., Near Field Communication (NFC), Bluetooth, WiFi, 4G/6G Long-Term Evolution (LTE), and so forth)), including PTU SRCU 136 and PRU SRCU 176 described in reference to FIG. 1.

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

In embodiments, the computing device 800 may comprise the wireless charging apparatus 102. For example, the computing device 800 may include the proximity sensor 180, control module 130 (e.g., as part of the computational logic 822), and PTU SRCU 136 as a part of communication interfaces 810. The computing device may further include other components of the apparatus 102, such as, for example, a charging module 120, Tx coil 126, and other components 122.

In some embodiments, the wireless charging apparatus 102 may be communicatively coupled with the electronic device 150 implemented as computing device 800 described herein. As shown, the computing device 800 may include camera 162, IR sensor 164, rotational sensor 166, user interaction detection component 168, control module 172, sensor hub 170, as well as power supply module 154 coupled with the Rx coil 152.

The above-described computing device 800's elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions implementing the operations associated with the wireless charging system 100, such as the control module 130 of FIG. 1. The various elements may be implemented by assembler instructions supported by processor(s) 802 or high-level languages that may be compiled into such instructions.

The permanent copy of the programming instructions of computational logic 822 may be placed into mass storage devices 806 in the factory, or in the field, through, for example, a distribution medium (not shown), such as a compact disc (CD), or through communication interface 810 (from a distribution server (not shown)).

The number, capability, and/or capacity of the elements 808, 810, 812 may vary, depending on whether computing device 800 is used as a stationary computing device, such as a set-top box, desktop computer, a charging pad, or a mobile computing device, such as a tablet computing device, laptop computer, game console, or smartphone. Their constitutions are otherwise known, and accordingly will not be further described.

At least one of processors 802 may be packaged together with memory having computational logic 822 configured to practice aspects of embodiments described in reference to FIGS. 1-4. For one embodiment, at least one of processors 802 may be packaged together with memory having computational logic 822 configured to practice aspects of process 500 of FIG. 5 to form a System in Package (SiP) or a System on Chip (SoC). For at least one embodiment, the SoC may be utilized in, e.g., but not limited to, a computing device, such as external device 120 of FIG. 1. In another embodiment, the SoC may be utilized to form the wireless charging system 100 of FIG. 1.

In various implementations, the computing device 800 may comprise a laptop, a netbook, a notebook, an ultrabook, a smartphone, a tablet, an ultra-mobile PC, a mobile phone, or a wearable device. In further implementations, the computing device 800 may be any other electronic device that processes data.

Example 1 is a wireless charging apparatus for charging an electronic device, comprising: a charging module to radiate an electromagnetic field, to wirelessly charge an electronic device in proximity to the wireless charging apparatus; and a control module communicatively coupled with the charging module, to adjust a power level of the electromagnetic field, radiated by the charging module, in response to a determination of an environmental condition in relation to the wireless charging apparatus, wherein the control module is to receive information indicative of the environmental condition from multiple sources, and make the determination based at least in part on the received information.

Example 2 may include the subject matter of Example 1, wherein the charging module is to radiate an electromagnetic field at a first power level, wherein to receive the information indicative of the environmental condition from the multiple sources includes to receive information from at least one sensor, wherein the environmental condition comprises a presence of human tissue in proximity to the wireless charging apparatus; and wherein the control module to adjust a power level of the electromagnetic field includes to: determine, based at least in part on the received information, whether the human tissue is present in the proximity to the wireless charging apparatus that is below a threshold distance; and cause the charging module to switch the radiation of the electromagnetic field from the first power level to a second power level or keep the radiation substantially at the first power level, based at least in part on a result of the determination.

Example 3 may include the subject matter of Example 2, wherein the at least one sensor is a proximity sensor disposed in the wireless charging apparatus, to provide an output signal that indicates the proximity of human tissue to the wireless charging apparatus that is below the threshold distance, to the control module.

Example 4 may include the subject matter of Example 3, wherein the charging module comprises circuitry to operate the radiation of electromagnetic field, wherein the circuitry includes: an induction coil to radiate the electromagnetic field; a power amplifier coupled with the induction to control current provided to the induction coil to radiate the electromagnetic field; and logic coupled with the proximity sensor and power amplifier, to control the power amplifier, in response to a provision of the output signal by the proximity sensor to the control module.

Example 5 may include the subject matter of Example 2, wherein the sensor is a proximity sensor disposed in the electronic device, to provide an output signal that indicates proximity of human tissue to the electronic device that is below a user-to-electronic device threshold distance, to the control module, wherein the electronic device is to communicate to the wireless charging apparatus information that indicates a presence of the electronic device in proximity to the wireless charging apparatus.

Example 6 may include the subject matter of any of Examples 1 to 5, wherein the multiple sources include at least some of: a camera, a proximity sensor, an infrared (IR) sensor, a rotational sensor, or a user interaction detection component to detect user activity on the electronic device, wherein the multiple sources are distributed between the wireless charging apparatus and the electronic device.

Example 7 may include the subject matter of Example 6, wherein the proximity sensor is disposed in the wireless charging apparatus, and wherein the IR sensor, the camera, and the component to detect user activity are disposed in the electronic device.

Example 8 may include the subject matter of Example 2, wherein the control module is to determine that the human tissue is present at a distance to the wireless charging apparatus that is below the threshold distance, and wherein to cause the charging module to switch the radiation from the first power level to a second power level or keep the radiation substantially at the first power level includes to switch the radiation to the second power level, wherein the second power level is lower than the first power level, and wherein the second power level is within a power range mandated by a governmental regulatory agency for electronic devices.

Example 9 may include the subject matter of Example 8, wherein the control module is to further determine that the human tissue is present at the distance to the wireless charging apparatus that is below the threshold distance for a period of time that is greater than an exposure time threshold.

Example 10 may include the subject matter of Example 8, wherein the control module to determine that the human tissue is present at a distance to the wireless charging apparatus that is below the threshold distance includes to: analyze the received information; determine that information received from at least one of the multiple sources indicates the presence of human tissue in the proximity to the wireless charging apparatus that is below the threshold distance; and resolve, in response to the determination, that human tissue is present in the proximity to the wireless charging apparatus that is below a threshold distance.

Example 11 may include the subject matter of Example 2, wherein the control module is to determine that the human tissue is not present at a distance to the wireless charging apparatus that is below the threshold distance, wherein the second power level that is greater than or equal to the first power level.

Example 12 is an electronic device, comprising: a plurality of sensors to detect indications of an environmental condition in relation to the electronic device; and an electronic device control module to: collect, from the plurality of sensors, information indicative of the environmental condition in relation to the electronic device; detect a presence of a wireless charging apparatus proximate to the electronic device; and provide the collected information to the wireless charging apparatus in response to the detection of presence of the wireless charging apparatus proximate to the electronic device, wherein the electronic device is to receive adjusted levels of charging power from the wireless charging apparatus in response to the provision of the collected information.

Example 13 may include the subject matter of Example 12, wherein the environmental condition comprises a presence of human tissue in proximity to the electronic device, wherein the plurality of sensors include two or more selected from: infrared (IR) sensor, rotational sensor, or a camera, wherein the electronic device further includes a user interaction detection component to detect user activity on the electronic device.

Example 14 may include the subject matter of Example 13, wherein the control module is to collect, from the plurality of sensors, information that indicates the presence of human tissue in the proximity to the electronic device, on a continuous or periodic basis, wherein the control module is further to collect user activity information from the user interaction detection component, and wherein the control module to provide the collected information to the wireless charging apparatus includes to provide user activity information.

Example 15 may include the subject matter of any of Examples 12 to 14, wherein the electronic device is a mobile device.

Example 16 is a method of charging an electronic device, comprising: receiving, at a control module of a wireless charging apparatus, from multiple sources, information indicative of an environmental condition in relation to the wireless charging apparatus; determining, by the control module, based at least in part on the received information, whether the environmental condition is present in relation to the wireless charging apparatus; and adjusting, by the control module, based at least in part on a result of the determining, a power level of electromagnetic field radiated by the wireless charging apparatus.

Example 17 may include the subject matter of Example 16, wherein the environmental condition comprises a presence of human tissue in proximity to the wireless charging apparatus, wherein determining whether the environmental condition is present in relation to the wireless charging apparatus includes determining, by the control module, that the human tissue is present in the proximity to the wireless charging apparatus that is below a threshold distance, for a period of time that is greater than an exposure time threshold, and wherein adjusting a power level includes switching, by the control module, the power level from a first power level to a second power level is lower than the first power level, wherein the second power level is within a power range mandated by a governmental regulatory agency for electronic devices.

Example 18 may include the subject matter of Example 16, wherein the environmental condition comprises a presence of human tissue in proximity to the wireless charging apparatus, wherein determining whether the environmental condition is present in relation to the wireless charging apparatus includes resolving, by the control module, that the human tissue is not present in the proximity to the wireless charging apparatus that is below a threshold distance, wherein adjusting a power level includes switching, by the control module, the power level from a first power level to a second power level is greater than the first power level or keeping the power level substantially at the first power level.

Example 19 may include the subject matter of Example 17, wherein determining that the human tissue is present in the proximity to the wireless charging apparatus that is below a threshold distance includes: analyzing, by the control module, the received information; determining, by the control module, that information received from at least one of the multiple sources indicates the presence of human tissue in the proximity to wireless charging apparatus that is below the threshold distance; and resolving, by the control module, in response to the determining, that human tissue is present in the proximity to the wireless charging apparatus that is below the threshold distance.

Example 20 is one or more non-transitory computing device-readable media having instructions for charging an electronic device stored thereon that, in response to execution on a wireless charging apparatus, cause the wireless charging apparatus to: receive, from multiple sources, information indicative of an environmental condition in relation to the wireless charging apparatus; determine, based at least in part on the received information, whether the environmental condition is present in relation to the wireless charging apparatus; and adjust, based at least in part on a result of the determination, a power level of electromagnetic field radiated by the wireless charging apparatus.

Example 21 may include the subject matter of Example 20, wherein the environmental condition comprises a presence of human tissue in proximity to the wireless charging apparatus, wherein the instructions that cause the wireless charging apparatus to determine whether the environmental condition is present in relation to the wireless charging apparatus further cause the wireless charging apparatus to determine that the human tissue is present in the proximity to the wireless charging apparatus that is below a threshold distance, for a period of time that is greater than exposure time threshold, wherein the instructions that cause the wireless charging apparatus to adjust a power level of electromagnetic field further cause the wireless charging apparatus to switch the power level from a first power level to a second power level is lower than the first power level, wherein the second level is within a power range mandated by a governmental regulatory agency for electronic devices.

Example 22 may include the subject matter of Example 20, wherein the environmental condition comprises a presence of human tissue in proximity to the wireless charging apparatus, wherein the instructions that cause the wireless charging apparatus to determine whether the environmental condition is present in relation to the wireless charging apparatus further cause the wireless charging apparatus to determine that the human tissue is not present in the proximity to the wireless charging apparatus that is below a threshold distance, wherein the instructions that cause the wireless charging apparatus to adjust a power level of electromagnetic field further cause the wireless charging apparatus to switch the power level from a first power level to a second power level is greater than the first power level or to keep the power level substantially at the first power level.

Example 23 may include the subject matter of any of Examples 20 to 22, wherein the electronic device is a mobile device, and wherein the wireless charging apparatus is a wireless charging pad.

Example 24 is an apparatus for charging an electronic device, comprising: means for receiving, from multiple sources, information indicative of an environmental condition in relation to the wireless charging apparatus; means for determining, based at least in part on the received information, whether the environmental condition is present in relation to the wireless charging apparatus; and means for adjusting, based at least in part on a result of the determining, a power level of electromagnetic field radiated by the wireless charging apparatus.

Example 25 may include the subject matter of Example 24, wherein the environmental condition comprises a presence of human tissue in proximity to the wireless charging apparatus, wherein means for determining whether the environmental condition is present in relation to the wireless charging apparatus includes means for determining that the human tissue is present in the proximity to the wireless charging apparatus that is below a threshold distance, for a period of time that is greater than an exposure time threshold, and wherein means for adjusting a power level includes means for switching the power level from a first power level to a second power level is lower than the first power level, wherein the second power level is within a power range mandated by a governmental regulatory agency for electronic devices.

Example 26 may include the subject matter of Example 24, wherein the environmental condition comprises a presence of human tissue in proximity to the wireless charging apparatus, wherein means for determining whether the environmental condition is present in relation to the wireless charging apparatus includes means for resolving that the human tissue is not present in the proximity to the wireless charging apparatus that is below a threshold distance, wherein means for adjusting a power level includes means for switching the power level from a first power level to a second power level is greater than the first power level or keeping the power level substantially at the first power level.

Example 27 may include the subject matter of Example 25, wherein means for determining that the human tissue is present in the proximity to the wireless charging apparatus that is below a threshold distance includes: means for analyzing the received information; means for determining that information received from at least one of the multiple sources indicates the presence of human tissue in the proximity to wireless charging apparatus that is below the threshold distance; and means for resolving, in response to the determining, that human tissue is present in the proximity to the wireless charging apparatus that is below the threshold distance.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:
1. A wireless charging apparatus for charging an electronic device, comprising:
  a proximity sensor disposed in the wireless charging apparatus, to provide an output signal that indicates the proximity of human tissue to the wireless charging apparatus;
  a charging module to radiate an electromagnetic field, to wirelessly charge an electronic device in proximity to the wireless charging apparatus, wherein the charging module includes: an induction coil to radiate the electromagnetic field; a power amplifier coupled with the induction coil to control current provided to the induction coil to radiate the electromagnetic field; and a logic gate coupled with the proximity sensor and power amplifier, to control the power amplifier; and
  a control module communicatively coupled with the charging module and proximity sensor wherein the control module is to generate, in response to the output signal received from the proximity sensor, a first control signal to be provided to a first input of the logic gate, wherein a second control signal to be provided to a second input of the logic gate is dependent on a state of the proximity sensor output signal and is to enable the power amplifier to control a charging current of the induction coil, to radiate the electromagnetic field to charge the electronic device.

2. The wireless charging apparatus of claim 1, wherein the charging module is to radiate an electromagnetic field at a first power level,
  wherein the control module is to adjust a power level of the electromagnetic field, which includes to:
  determine, based at least in part on the received output signal, whether the human tissue is present in the proximity to the wireless charging apparatus that is below a threshold distance; and
  cause the charging module to switch radiation of the electromagnetic field from the first power level to a second power level or keep the radiation substantially at the first power level, based at least in part on a result of the determination.

3. The wireless charging apparatus of claim 2, wherein the control module is to receive information from multiple sources that include at least some of: a camera, an infrared (IR) sensor, a rotational sensor, or a user interaction detection component to detect user activity on the electronic device, wherein the multiple sources are distributed between the wireless charging apparatus and the electronic device.

4. The wireless charging apparatus of claim 3, wherein the IR sensor, the camera, and the component to detect user activity are disposed in the electronic device.

5. The wireless charging apparatus of claim 3, wherein the control module is to determine that the human tissue is present at a distance to the wireless charging apparatus that is below the threshold distance, and
  to switch the radiation to the second power level, wherein the second power level is lower than the first power level, and wherein the second power level is within a power range mandated by a governmental regulatory agency for electronic devices.

6. The wireless charging apparatus of claim 5, wherein the control module is to further determine that the human tissue is present at the distance to the wireless charging apparatus that is below the threshold distance for a period of time that is greater than an exposure time threshold.

7. The wireless charging apparatus of claim 5, wherein the control module to determine that the human tissue is present at a distance to the wireless charging apparatus that is below the threshold distance includes to:

determine that the information received from at least one of the multiple sources indicates the presence of human tissue in the proximity to the wireless charging apparatus that is below the threshold distance.

8. The wireless charging apparatus of claim 2, wherein the control module is to determine that the human tissue is not present at a distance to the wireless charging apparatus that is below the threshold distance, wherein the second power level is greater than or equal to the first power level.

9. An electronic device, comprising:
a plurality of sensors to detect indications of an environmental condition in relation to the electronic device, wherein the environmental condition comprises a presence of human tissue in proximity to the electronic device; and
an electronic device control module that includes a user interaction detection component to detect user activity on the electronic device, wherein the control module is to: collect, from the plurality of sensors, information that indicates the presence of human tissue in the proximity to the electronic device, on a continuous or periodic basis; collect user activity information from the user interaction detection component; detect a presence of a wireless charging apparatus proximate to the electronic device; and provide the collected information, including user activity information, to the wireless charging apparatus in response to the detection of the presence of the wireless charging apparatus proximate to the electronic device, wherein the plurality of sensors include two or more selected from: infrared (IR) sensor, rotational sensor, or a camera, wherein the electronic device is to receive adjusted levels of charging power from the wireless charging apparatus in response to the provision of the collected information.

10. The electronic device of claim 9, wherein the electronic device is a mobile device.

11. A method of charging an electronic device, comprising:
receiving, by a control module of a wireless charging apparatus, from a proximity sensor disposed in the wireless charging apparatus, an output signal indicative of presence of human tissue in proximity to the wireless charging apparatus for a period of time that is greater than an exposure time threshold;
determining, by the control module, the presence of human tissue in proximity to the wireless charging apparatus for the period of time that is greater than the exposure time threshold; and
adjusting, by the control module, a power level of electromagnetic field radiated by the wireless charging apparatus, including:
generating, in response to the output signal received from the proximity sensor, a first control signal to be provided to a first input of a logic gate of a charging module coupled with the control module, wherein the charging module further includes an induction coil to radiate the electromagnetic field; a power amplifier coupled with the induction coil to control current provided to the induction coil to radiate the electromagnetic field, wherein the logic gate is coupled with the proximity sensor and power amplifier; and
providing a second control signal to a second input of the logic gate, based at least in part on a state of the proximity sensor output signal, to enable the power amplifier to control a charging current of the induction coil, to radiate the electromagnetic field to charge the electronic device.

12. The method of claim 11,
further comprising: determining, by the control module, that the human tissue is present in the proximity to the wireless charging apparatus that is below a threshold distance, for the period of time that is greater than the exposure time threshold, and
wherein adjusting a power level includes switching, by the control module, the power level from a first power level to a second power level is lower than the first power level, wherein the second power level is within a power range mandated by a governmental regulatory agency for electronic devices.

13. The method of claim 11,
further comprising: resolving, by the control module, that the human tissue is not present in the proximity to the wireless charging apparatus that is below a threshold distance,
wherein adjusting a power level includes switching, by the control module, the power level from a first power level to a second power level is greater than the first power level or keeping the power level substantially at the first power level.

14. One or more non-transitory computing device-readable media having instructions for charging an electronic device stored thereon that, in response to execution on a wireless charging apparatus, cause the wireless charging apparatus to:
receive, from a proximity sensor disposed in the wireless charging apparatus, an output signal indicative of a presence of human tissue in proximity to the wireless charging apparatus for a period of time that is greater than an exposure time threshold;
determine the presence of human tissue in proximity to the wireless charging apparatus for the period of time that is greater than the exposure time threshold; and
adjust, based at least in part on a result of the determination, a power level of electromagnetic field radiated by the wireless charging apparatus, which includes:
generate, in response to the output signal received from the proximity sensor, a first control signal to be provided to a first input of a logic gate of a charging module of the wireless charging apparatus, wherein the charging module further includes an induction coil to radiate the electromagnetic field; a power amplifier coupled with the induction coil to control current provided to the induction coil to radiate the electromagnetic field, wherein the logic gate is coupled with the proximity sensor and power amplifier; and
provide a second control signal to a second input of the logic gate, based at least in part on a state of the proximity sensor output signal, to enable the power amplifier to control a charging current of the induction coil, to radiate the electromagnetic field to charge the electronic device.

15. The non-transitory computing device-readable media of claim 14, wherein the instructions further cause the wireless charging apparatus to determine that the human tissue is present in the proximity to the wireless charging apparatus that is below a threshold distance, for the period of time that is greater than the exposure time threshold,
wherein the instructions that cause the wireless charging apparatus to adjust a power level of electromagnetic field further cause the wireless charging apparatus to switch the power level from a first power level to a second power level is lower than the first power level, wherein the second power level is within a power range mandated by a governmental regulatory agency for electronic devices.

16. The non-transitory computing device-readable media of claim 14,
wherein the instructions further cause the wireless charging apparatus to determine that the human tissue is not present in the proximity to the wireless charging apparatus that is below a threshold distance,
wherein the instructions that cause the wireless charging apparatus to adjust a power level of the electromagnetic field further cause the wireless charging apparatus to switch the power level from a first power level to a second power level is greater than the first power level or to keep the power level substantially at the first power level.

17. The non-transitory computing device-readable media of claim 14, wherein the electronic device is a mobile device, and wherein the wireless charging apparatus is a wireless charging pad.

\* \* \* \* \*